March 13, 1951 R. E. GRILL ET AL 2,544,830
JATO RELEASE DEVICE

Filed Oct. 5, 1948 3 Sheets-Sheet 1

INVENTORS
RAYMOND E. GRILL
BY VERNON L. WHITE
Herbert E. Metcalf
Attorney

March 13, 1951  R. E. GRILL ET AL  2,544,830
JATO RELEASE DEVICE

Filed Oct. 5, 1948  3 Sheets-Sheet 2

INVENTORS
RAYMOND E. GRILL
BY VERNON L. WHITE

Herbert E. Metcalf
Attorney

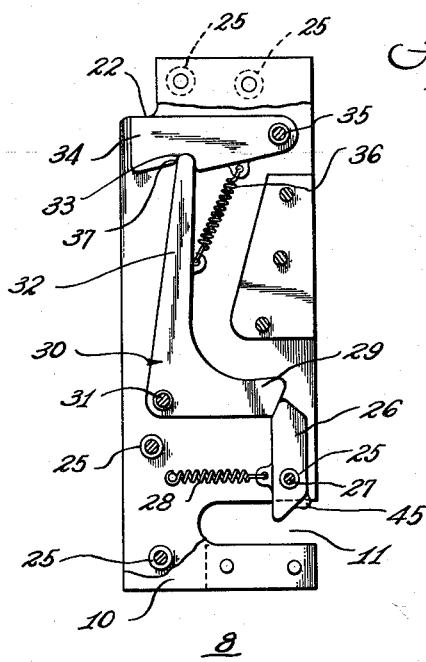
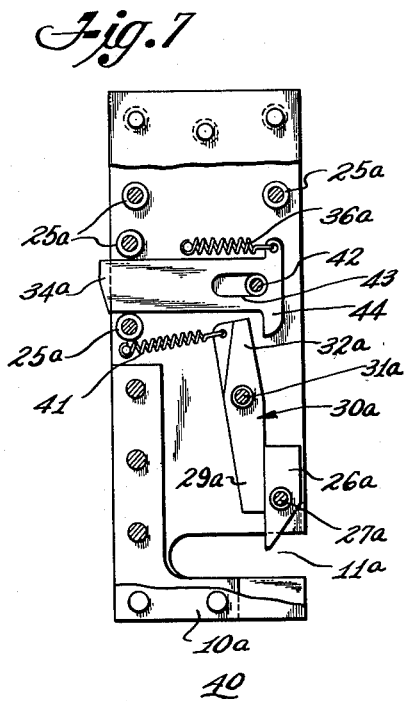
INVENTORS
RAYMOND E. GRILL
BY VERNON L. WHITE
Herbert E. Metcalf
Attorney Patented Mar. 13, 1951

2,544,830

UNITED STATES PATENT OFFICE 2,544,830

JATO RELEASE DEVICE

Raymond E. Grill, Long Beach, and Vernon L. White, Los Angeles, Calif., assignors to Northrop Aircraft, Inc., Hawthorne, Calif., a corporation of California Application October 5, 1948, Serial No. 52,914

8 Claims. (Cl. 244—137)

This invention relates to airplanes, and more particularly to an improved means for mounting rocket units on an airplane to provide a jet-assisted take-off, and for releasing the expended rocket units from the airplane.

In the use of very fast airplanes with high take-off and landing speeds, and large airplanes carrying heavy fuel and cargo loads, long airfield runways are normally needed, so that these airplanes will have the required distance available for safe take-off operations. In order to permit such airplanes to operate from regular fields or to take off with extremely heavy loads, rocket-assist units have been designed to attach on the fuselage or the wings of the aircraft for the purpose of providing an additional amount of thrust, accelerating the airplane from rest to flying speed in a shorter time and enabling it to become airborne after a shorter ground run.

These jet assisted take-off units, often termed "jato" units, are ignited by the pilot at the start of or during the take-off run, and burn for only a few seconds, after which time they are usually released to fall from the airplane. In high speed airplanes particularly, the jato attachment fittings, if allowed to remain projecting into the airstream, constitute a source of undesirable drag. It is, therefore, an object of the present invention to provide a jato support device which will retract flush with the airplane skin after the jato units are dropped.

If the airplanes equipped in this manner are required to take off from a highly congested area or near a residential district, for example, automatic release of the jato units immediately after their operational period might cause injury or damage. It is also an object of the present invention to provide a jato release means under separate control of the pilot so that he may retain the expended units until he wishes to drop them.

Another object of this invention is to provide a simple and light-weight jato attachment and release device wherein the separation after release is affected by the air resistance on the jato unit, and so designed that this separation may be accomplished at relatively low airplane speed, under 200 miles per hour. This is a definite advantage in that the jato units can be dropped more quickly, if desired, without waiting until a high airspeed is attained.

Other objects and advantages of the invention will be apparent or will be specifically pointed out in the description forming a part of this specification, but the invention is not limited to the embodiment herein described, as various forms may be adopted within the scope of the claims.

Referring to the drawings:

Figure 6 is a detailed side view showing the forward attachment hook assembly with one side plate removed.

Figure 7 is a detailed side view showing the aft attachment hook assembly with one side plate removed.

In broad terms, the invention comprises hook assemblies containing a latch which will allow the exit of the jato unit attachment lugs when the hook mechanism is released by the operation of a solenoid plunger or other device, the plunger also releasing the hook assembly to retract to a position flush with the airplane skin under the action of a spring. Some hook latches for any one jato unit need not positively retain the attachment lugs, but may merely be for the purpose of retracting the spring-loaded hook when the jato unit drops.

Figure 1:
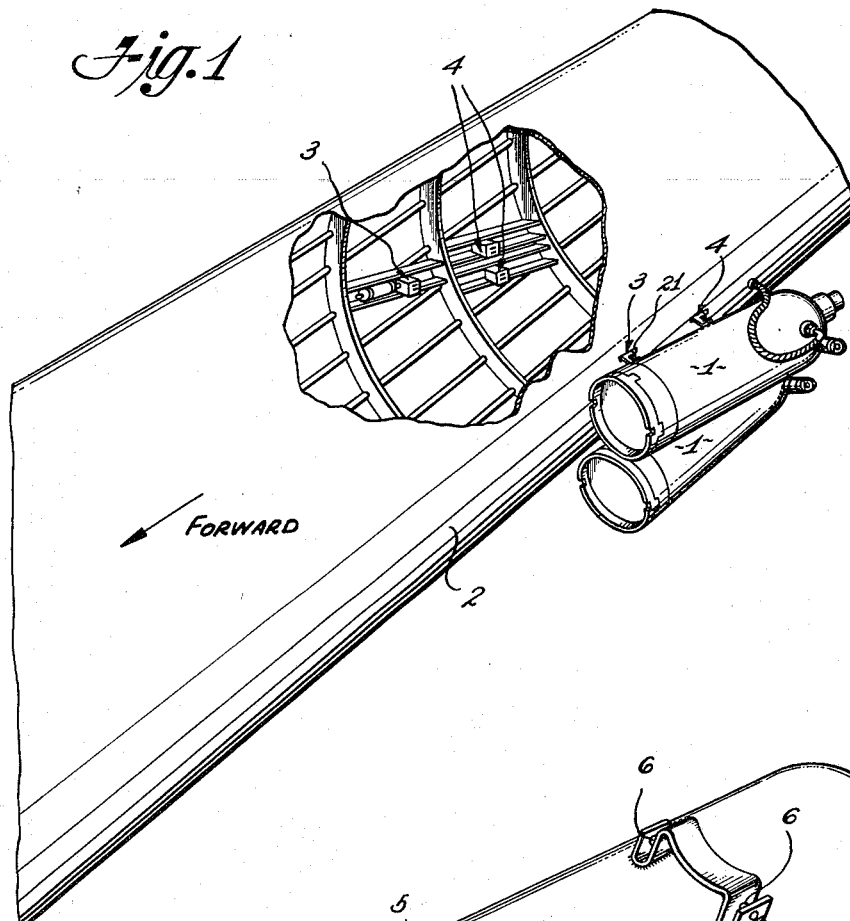
Figure 1 is a perspective view showing the installation of a group of jet-assisted take-off units on the sides of an airplane fuselage.
Figure 2:
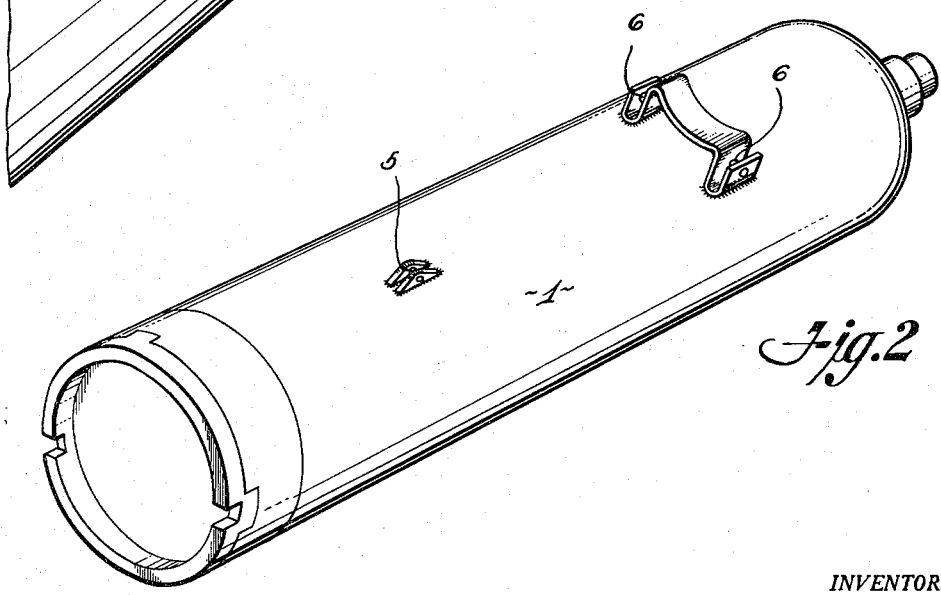
Figure 2 is a perspective outline view of one jato unit showing its attachment lugs.

In Figure 1, two jato units 1, 1 are shown attached to the left-hand lower side of an airplane fuselage 2. Each jato unit is hung on one forward hook installation 3 and two aft hook installations 4 which are positioned in the airplane to project outwardly normal to the fuselage 2, the unit being provided with one forward attachment lug 5 and two aft attachment lugs 6, as shown in Figure 2.

Figure 3:
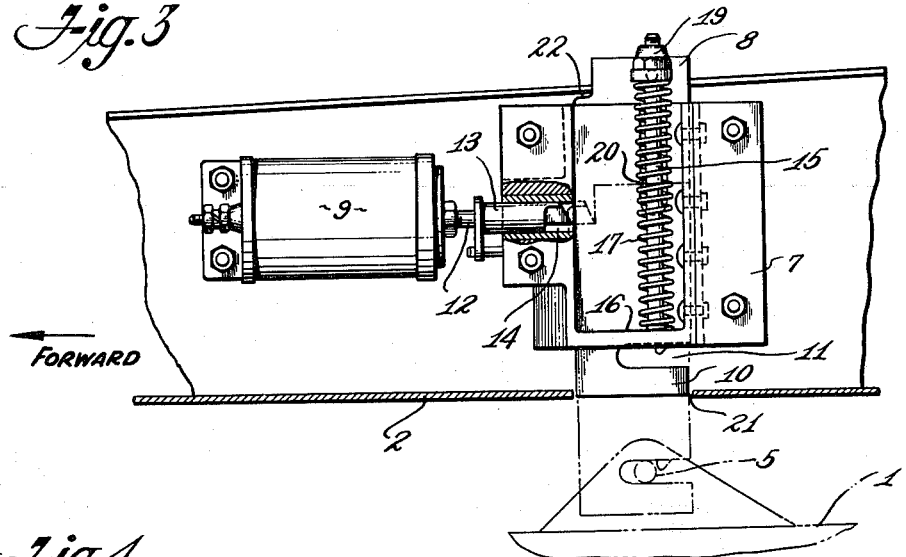
Figure 3 is a cut-away side view in the plane of the fuselage skin showing a jato forward attachment hook and release solenoid installation.

Referring to Figure 3, each forward hook installation 3 consists of a forward holder 7 bolted to the airplane structure, a forward hook assembly 8 slidable within its holder, and a solenoid 9 also fixed to the airframe. The forward hook assembly 8 includes a hook 10 which is provided with a hook slot 11 open at the rear. The solenoid 9 has a plunger shaft 12 to which is adjustably attached a plunger 13. When this solenoid 9 is not energized, the shaft 12 and plunger 13 are spring-urged outwardly in a rearward direction, and when the solenoid is electrically energized, the plunger 13 is pulled forward against the spring force.

Figure 4:
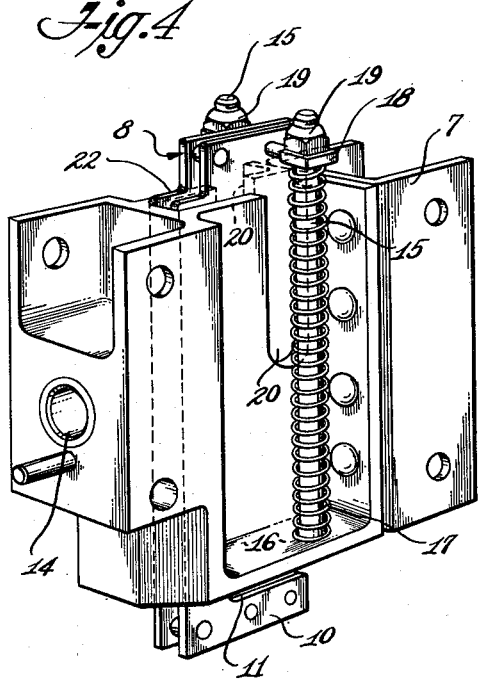
Figure 4 is a perspective view showing the parts of a jato forward attachment hook installation.

The forward holder 7, Figure 4, contains a plunger hole 14 through which the plunger 13 acts and reaches to the interior of the holder. This interior portion is open from top to bottom to carry the forward hook assembly 8. Two spring guides 15 are attached, one on each side of the holder, to a seat 16, a retraction spring 17 fits around each spring guide 15, and each spring guide passes through a coupler 18 installed crosswise through the top of the hook assembly 8. A guide nut 19 threaded over the end of each spring guide 15 contacts the coupler 18 and thereby limits the inward motion of the hook 10, although the hook may be pulled outwardly, compressing the retraction springs 17 between the coupler 18 and the seat 16. Outward travel of the hook with the coupler 18 is permitted by holder slots 20, 20, which extend partially along the sides of the holder 7, into which the coupler 18 can move.

The assembly as described above is mounted near the fuselage skin so that when the hook 10 is pulled outwardly, it projects through a matching hole 21 in the fuselage 2. The guide nuts 19, 19 are adjusted so that when the hook 10 is in the fully retracted position, its outer end is flush with the side of the fuselage 2.

The forward inboard corner of the forward hook assembly 8 is cut away to form a locking surface 22 which, when the hook 10 is extended, will fit under the plunger 13 so as to lock the hook assembly 8 in the extended position. Upon actuation of the solenoid 9, the plunger 13 withdraws from the locking surface 22 and the hook 10 springs to the retracted position.

Direct reference to Figure 6 will illustrate the construction of the forward hook assembly 8 in retaining and releasing the jato unit 1, and this construction will now be described. The hook 10 itself consists of two side plates, the top one of which is cut away in this figure to expose the interior parts. Spacers 25 hold the hook plates in the proper spaced relation, and pins through these spacers 25 and through the plates are peened into the countersunk exterior of the plates to hold the assembly together. This preferred means of assembly leaves the hook members with flush surfaces so that retraction and extension of the hook is not hindered.

A latch 26 is rotatably mounted on a latch pivot 27 near its center and elastically held with its longest center line longitudinal of the hook by a latch spring 28 whose line of action, in this central position named, passes through the latch pivot 27. Thus, when displaced in either direction, the latch 26 will return to the central position. The lower end of the latch 26 intersects the hook slot 11, and the forward side of the upper end rests just touching a lower arm 29 of a trigger 30. The trigger 30 is rotatably mounted on a trigger pivot 31 at the forward end of the lower arm 29, and an upper arm 32 fits a sear recess 33 in a sear 34. The sear 34 is rotatably mounted at its aft end on a sear pivot 35, and a sear spring 36 attached between the sear 34 and the trigger upper arm 32 elastically holds these two parts in this specified position, which is the latched position.

The forward end of the top edge of the sear 34, when the parts are in the latched position as described above, lies coincident with the hook locking surface 22 previously mentioned. Thus, the solenoid plunger 13, as well as holding the hook 10 in the extended position as described before, also holds the sear 34 in the latched position and will not allow it to be moved up. As long as the sear 34 is being held down with the sear recess 33 covering the end of the trigger upper arm 32, the trigger 30 cannot rotate, and as long as the trigger is being held stationary, the latch 26 cannot be moved in a counterclockwise direction since it is butting against the trigger lower arm 29. Therefore, as long as the solenoid 9 remains non-actuated, the jato forward attachment lug 5 installed in the hook 10 is prevented from sliding out the rear of the hook slot 11.

Rearward pressure of the jato forward attachment lug 5 on the lower end of the latch 26 causes the upper end of the latch to exert a force on the lower arm 29 of the trigger 30. The surface angle at the point of contact between the latch 26 and trigger 30 is such that this force is producing a counterclockwise moment on the trigger 30. This moment in turn is causing the end of the trigger upper arm 32 to push on the forward side of the sear recess 33. The sear recess 33 is constructed with a sloping forward side 37 so that this push by the trigger upper arm 32 exerts a clockwise moment on the sear 34. Therefore, the sear 34 is pushing upwardly against the plunger 13 with a definite force, and withdrawal of the plunger 13 by actuation of the solenoid 9 is all that is needed to allow the jato unit 1 to move back and off the hook 10, since the forces involved are ample to overcome the friction and insignificant forces of the small latch spring 28 and sear spring 36.

In the preferred apparatus shown herein, the latch 26 of the forward hook assembly 8 is the only latch which holds the jato unit 1 in place. As stated above, release is effected by air resistance on the jato unit. During the burning period of the jato unit, the forward attachment lug 5 is pushing against the forward, closed end of the hook 10, and at any other time rearward pressure on the latch 26 is present. Depending upon the strength of the solenoid 9 required to assure plunger 13 release under all conditions, the critical angles involved in the hook mechanism can be varied to produce a given upward force on the plunger 13 by a variety of air loads on the jato unit 1.

In other words, the minimum air speed of the airplane at which the force produced by the air resistance on the jato unit is sufficient to cause rotation of the sear 34 upon actuation of the solenoid 9, may be calculated, and any possible variation in efficiency of the hook release mechanism may be used. It will be noted that while an electric solenoid is most convenient to use for this purpose, an air cylinder or hydraulic cylinder delivering more power can also be used. If this is done, a higher load may be carried by the sear without jamming and preventing high speed release of a jato unit where the release mechanism was designed to permit low speed release.

Figure 5:
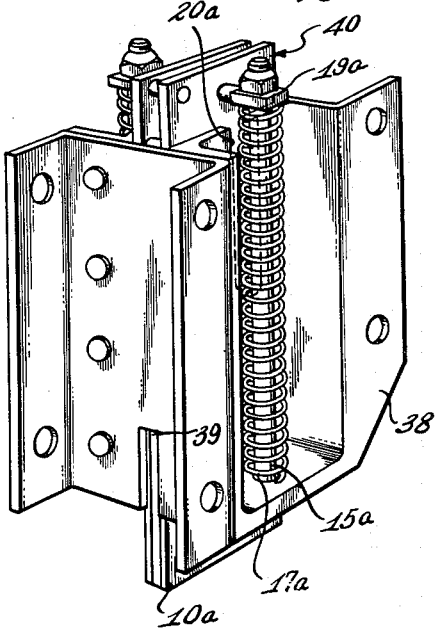
Figure 5 is a perspective view showing the parts of a jato aft attachment hook installation.

The aft attachment hook installations, as shown in Figure 5, are similar to the forward hook as described above, with the exception that no solenoids are used, and, therefore, the hook assembly parts differ. The aft holder 38 contains no plunger hole, but the forward side of the interior portion carrying the hook 10a is provided with a notch 39 open at the outboard end. The purpose of this notch will be discussed later. The same retraction system is used as in the forward installation 3, with spring guides 15a, retraction springs 17a, coupler 19a, and holder slots 20a.

The aft hook assembly 40, Figure 7, comprises a latch 26a, trigger 30a, and sear 34a, arranged in the following manner: the latch 26a is rotatably mounted on a latch pivot 27a near its center, and the lower end intersects the hook slot 11a similar to the forward hook latch 26. The forward side of the latch 26a central portion and upper end rests against the aft side of a lower arm 29a of the trigger 30a. The trigger 30a is rotatably mounted, in the plane of the hook, on a trigger pivot 21a near the center of the trigger. A trigger spring 41 connects to the forward side of a trigger upper arm 32a and exerts a counterclockwise moment on the trigger 30a which keeps the trigger lower arm 29a always in contact with the latch 26a, thus tending to hold the latch 26a in the central, or latched, position.

The sear 34a is mounted in a position crosswise to the retraction path of the hook 10a, supported by a sear pin 42 riding in a sear slot 43, and guided near the forward end by two of the hook plate spacers 25a, 25a so that sear 34a motion is in a straight fore-and-aft line, limited by the ends of the sear slot 43. A sear spring 36a tends to hold the sear 34a in its most forward position, where the forward end projects beyond the hook forward sides. When the hook 10a is installed in the aft holder 38 and pulled outwardly to the extended position, the sear 34a will snap into the holder notch 39 and lock the hook in this position.

The rear end of the sear 34a forms a sear hook 44, the forward side of which faces the rear side of the trigger upper arm 32a, and will be contacted by this upper arm when the trigger 30a rotates clockwise during jato unit release.

Operation of the aft hook assembly 40 is now evident. The latch 26a does not prevent release of the jato unit aft attachment lug 6, but when the unit is released at the forward latch 26, rearward pressure by the moving jato unit will rotate the latch 26a counterclockwise. This moves the upper end of latch 26a forward, rotating trigger 30a against sear hook 44, and moving sear 34a out of holder notch 39, whereupon the hook 10a will be retracted by retraction springs 17a when the jato unit leaves the hook.

Some of the advantages of this invention after retraction of the hooks will now be pointed out. At the forward hook, the latch 26 carries a projection 45 which normally falls within the sides of the hook 10, but when the latch 26 is rotated by the jato forward attachment lug 5 in being released, this projection 45 will jut out beyond the hook sides. As the hook then retreats, the latch projection 45 will contact the structure of the forward holder 7 and be returned to its latched position. Also, the trigger 30 will be pulled back into the sear recess 33 by the sear spring 36, so that the hook mechanism is ready for loading another jato unit when pulled to the extended position. During loading, the lower end of the latch 26 merely moves forward as the jato unit forward lug 5 enters the hook and then springs in place again behind the lug.

At the aft hook, during jato release, the jato unit aft lug 6 turns the latch 26a endwise with its flat top resting against the trigger lower arm 29a. This position places the latch lower end beyond the rear side of the hook 10a so that the aft holder 38 will strike it during retraction and reset the aft hook mechanism in a manner similar to that of the forward hook. The aft hooks are thus ready for loading as soon as they are cocked in the extended position. During loading, the jato unit lug will cause the trigger 30a to be rotated a short distance, but this will not retract the aft hook 10a since a space exists between the trigger upper arm 32a and the sear 34a, so that some motion can occur before the sear 34a is actuated.

It will be obvious that the present invention is equally well adapted to jato installations where the units hang vertically from the bottom of a surface, and can be successfully used on slanting surfaces which are nearly vertical. The invention is also deemed to serve the purpose of supporting a ram-jet engine, for example, or any other device which is to be attached to a vehicle, restrained against a forward force produced by itself, and released at some instant when no forward thrust is being developed by the attached device.

What is claimed is:

1. In combination, a body, a frame slidable in said body to project beyond a surface of said body, elastic means urging said frame inwardly to a position at least flush with said surface, means for locking said frame against said urge in a position projecting from said surface, a hook on the outer end of said frame and adapted to receive a member urged to leave said hook, movable hook closing means at least partially closing the open end of said hook when said member is in said hook, and means connected to said frame locking means to unlock said frame simultaneously with movement of said hook closing means under the urge of said member.

2. Apparatus in accordance with claim 1 wherein said frame locking means is associated with said hook closing means to hold said member in said hook against the urge of said member simultaneously with locking said frame in said projecting position, and wherein manual unlocking means is provided to substantially simultaneously release said hook closing means and unlock said frame locking means.

3. Apparatus in accordance with claim 1 wherein said hook closing means is associated with said frame locking means to unlock said frame locking means by movement of said hook closing means by the urge of said member.

4. Attachment means comprising a hook closed on three sides, a latch mechanism elastically urged to a central position, a latch member crossing the fourth side of said hook, elastically-urged means for locking said latch mechanism in its central position against pressure on said latch member from within said hook but not from without, means for actuating said locking means against its elastic urge to unlock said latch mechanism allowing said latch mechanism to be displaced from its central position when said latch member is under pressure from within said hook, a holder, said hook being linearly movable within said holder and elastically urged to an urged-limit position within said holder, said locking means being adapted to hold said hook away from its urged-limit position simultaneously with locking said latch mechanism, and also adapted to release said hook to its urged-limit position substantially simultaneously with unlocking said latch mechanism.

5. Apparatus in accordance with claim 4 wherein said locking means comprises a plunger movable axially in a hole in said holder and elastically urged to a locking position in simultaneous contact with a locking surface of said hook and said latch mechanism when said hook is pulled sufficiently away from said urged-limit position, to hold said hook away from its urged-limit position and to lock said latch mechanism, and wherein said actuating means is manually energizable and connected to move said plunger away from said locking position, when energized, to withdraw said plunger from contact with said locking surface and said latch mechanism.

6. Attachment means comprising a holder, a hook linearly movable within said holder and elastically urged to an urged-limit position within said holder, elastically urged means for locking said hook in a position away from its urged-limit position, a latch mechanism elastically urged to a central position, a movable latch member crossing the open side of said hook, said latch mechanism being adapted to unlock said locking means against its elastic urge to allow said hook to return to its urged-limit position when said latch member is moved by pressure from within said hook, and also being adapted to permit said latch member to move against the elastic urge of said latch mechanism when under pressure from outside said hook without releasing said locking means.

7. Apparatus in accordance with claim 6 wherein said locking means comprises a sear elastically urged to a locking position in engagement with a notch in said holder when said hook is pulled sufficiently away from said urged-limit position, and wherein a trigger of said latch mechanism is located to contact said sear to move said sear away from said locking position when said latch member is moved by pressure from within said hook, to permit said hook to be returned to its urged-limit position.

8. Attachment means for a device requiring two or more supports wherein at least one of said supports comprises an outside surface, a hook, elastic means urging said hook inwardly to a position at least flush with said surface, movable hook closing means at least partially closing the open end of said hook when said device is in said hook, and means for simultaneously locking said hook against said urge in a position projecting from said surface and locking said hook closing means against movement by said device from within said hook, said locking means being actuatable to substantially simultaneously unlock said hook closing means whereby said device can be readily separated from said hook and release said hook from said projecting position, and wherein the remainder of said supports comprises at least one similar elastically-urged hook, a latch mechanism for locking said similar hook in a similarly projecting position, and similar hook closing means, said latch mechanism having a driven connection with said similar hook closing means to release said similar hook from said projecting position by movement of said similar hook closing means resulting from separation of said device from said similar hook.

RAYMOND E. GRILL.
VERNON L. WHITE.

REFERENCES CITED

The following references are of record in the file of this patent:

UNITED STATES PATENTS

| Number | Name | Date |
|---|---|---|
| 1,557,795 | Bolgiano | Oct. 20, 1925 |
| 2,393,105 | Hasselhorn | Jan. 15, 1946 |
| 2,400,248 | Morgan | May 14, 1946 |
| 2,426,537 | Van Dorn | Aug. 26, 1947 |
| 2,478,019 | Sonntag | Aug. 2, 1949 |